May 2, 1961  V. M. ERICKSON ET AL  2,982,908

SENSING APPARATUS

Filed Nov. 12, 1957

INVENTORS
VERDIS M. ERICKSON
DONALD C. JOHNSTON
BY
ATTORNEY

United States Patent Office 2,982,908
Patented May 2, 1961

2,982,908
SENSING APPARATUS

Verdis M. Erickson, St. Paul, and Donald C. Johnston, Minneapolis, Minn., assignors to Minneapolis-Honeywell Regulator Company, Minneapolis, Minn., a corporation of Delaware Filed Nov. 12, 1957, Ser. No. 695,855

10 Claims. (Cl. 323—69)

This invention relates to fluid level sensors and more particularly to a bridge circuit containing negative temperature coefficient devices which may be mounted in a container at such a level as to be able to unbalance the bridge when the liquid level condition changes.

The primary consideration in any liquid level sensing device is that it must be able to distinguish between liquid and air under all conditions. A negative temperature coefficient resistor, hereinafter referred to as thermistor, changes resistance when transferred from fuel to air, or vice-versa, because it is able to lose its heat more quickly in fuel than in air and hence in fuel its temperature is lower and its resistance higher. Many bridge circuits have been designed to utilize this effect in a thermistor but all have had certain disadvantages which the present invention overcomes. Under extreme conditions, a thermistor may not be able to distinguish between hot fuel and cold air and hence fails to meet the primary consideration. To overcome this disadvantage, several circuits have used a second thermistor to provide temperature compensation but these circuits have had inherently slow response. Uncompensated circuits may be designed to have fast response, but these have had the problem of lack of voltage regulation as well as no temperature compensation.

It is therefore an object of our invention to provide an improved thermistor bridge circuit which will quickly respond to changes in the measured conditions, which is insensitive to changes in supply voltage and operation of which is not impaired by changes in ambient temperature.

This and other objects will be obvious upon examination of the drawings and description in which.

Figure 1:
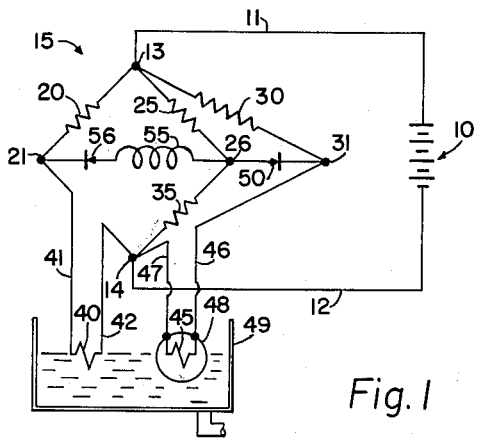
Figure 1 is a schematic representation of a preferred embodiment of our invention.

Referring to Figure 1, a source of voltage 10 is connected by means of conductors 11 and 12 to junctions 13 and 14, respectively, of a modified bridge circuit 15. A first impedance which may be a resistor 20 is connected to junction 13 and to a junction 21 of circuit 15, a second impedance 25 is connected to junction 13 and a junction 26 of circuit 15 and a third impedance 30 is connected to junction 13 and to a junction 31, of circuit 15. A fourth impedance 35 is connected between junctions 26 and junction 14. A negative temperature coefficient device such as thermistor 40 is connected between junction 21 and junction 14 by means of conductors 41 and 42, and a second negative temperature coefficient device 45 is connected between junction 31 and junction 14 by means of conductors 46 and 47. Thermistor 45 is mounted in an envelope 48 which is sealed and which allows thermistor 45 to always remain exposed to air whether the envelope 48 is immersed in fuel or not.

Thermistors 40 and 45 are mounted in a container 49 adapted to contain a fluid such as fuel, at a level or position where it is desired to have a signal when fluid passes it. Both thermistors 45 and 40, which may be chosen to have substantially like characteristics, are so arranged that they are at the same level in the container so that whatever temperature is influencing thermistor 40 will also influence thermistor 45. Connected between junctions 26 and 31 is a substantially unidirectional constant voltage device such as a diode 50. Diode 50 is arranged to allow current to flow from point 26 to point 31 but to prevent current flow from point 31 to point 26. A suitable detecting device such as a relay 55 is connected in series with one end of a second unidirectional device such as a diode 56. The series circuit comprising relay 55 and diode 56 is connected between junctions 21 and 26 and diode 56 is arranged to allow current flow between point 26 and point 21 but to prevent current flow from point 21 to point 26.

The operation of Figure 1 and the purpose of components included therein will be further explained.

Figure 2:
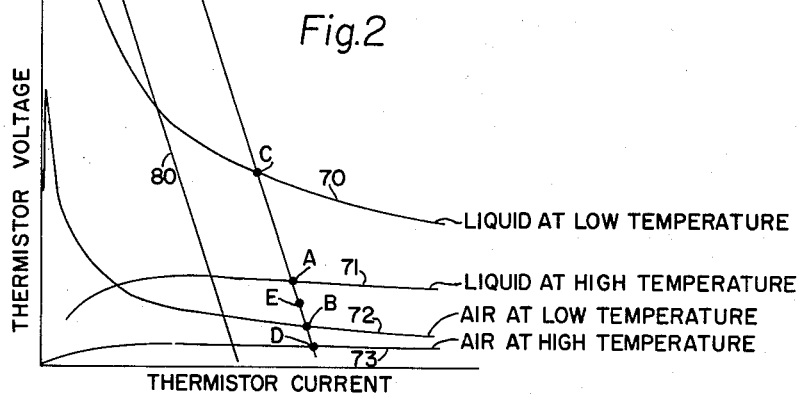
Figure 2 is a graph showing the variation of voltage with current in a typical thermistor when placed in liquid and in air at typical limiting temperatures.

Figure 2 shows a graph of thermistor current versus thermistor voltage at various temperatures both in liquid and in air. Curve 70 represents the variation in voltage and current across a thermistor when the thermistor is exposed to liquid at low temperature, curve 71 shows the variation of thermistor current with thermistor voltage when the thermistor is exposed to liquid at high temperature. Curve 72 shows the variation in voltage across a thermistor with thermistor current when the thermistor is placed in air at low temperature. Curve 73 represents the variation in voltage across the thermistor with the variation in current through the thermistor when the thermistor is placed in air at high temperature. Curve 75 represents the load line of the circuit of Figure 1 when the voltage source 10 is at some voltage E and when there is no current through the diodes 50 and 56. It is seen from Figure 2 that when a voltage E is placed across the circuit of Figure 1, thermistor 40 in liquid at high temperature will have a voltage across it of an amount equal to that shown at A of Figure 2 and thermistor 45 would have a voltage substantially equal to that shown at D since thermistor 45 is exposed to the same temperature as thermistor 40 but is in air. When in air at low temperature, thermistors 40 and 45 would have a voltage across them equal to that shown at B in Figure 2 although actually the voltage across thermistor 45 may be slightly lower because conduction of heat is slightly hindered by the envelope 48. In actual practice the voltage difference between point A and point B is usually very small. If in the circuit of Figure 1 thermistor 40 is in liquid at high temperature, the voltage at point 21 would be that corresponding to point A. If the voltage at point 26 is greater than the voltage at point 21 current will flow through relay 55 and the voltage at point 21 would shift from point A to the right along curve 71, however the voltage along curve 71 is fairly constant. If, however, the voltage at point 26 is lower than at point 21 no current will flow through relay 55. Assuming a condition where the voltage at point 26 is lower than that at point 21 when the thermistor 40 is in liquid at high temperature, there is no current flowing through relay 55. Now if it is desired to give an indication when the fuel level becomes such that thermistor 40 is exposed to air it is desirable to then have current flow through relay 55. It is seen that in Figure 2 when the thermistor 40 becomes exposed to air at the low temperature the voltage at point 21 becomes equal to that at point B. The voltage at point 26 must now be greater than the voltage at B in order for the relay 55 to detect that the thermistor 40 is out of the liquid. It is seen, then, for correct operation of the circuit of Figure 1 that the voltage at point 26 must be lower than A when the thermistor 40 is in liquid and must be higher than B when the thermistor is in air. Since the voltage between A and B is actually very small, voltage regulation of point 26 is obviously necessary.

If the temperature of the liquid is increased even more than shown in Figure 2, line 71 will be even lower. If the temperature of the air in Figure 2 is decreased even more, line 72 will raise. Eventually such a condition may be reached that lines 71 and 72, or points A and B, become superimposed or even cross. In such a case the voltage at point 26 could not be between points A and B and still have the system work so temperature compensation of point 26 is necessary. This temperature compensation is provided by the thermistor 45. Inasmuch as the temperature surrounding thermistor 45 is always the same as the temperature surrounding thermistor 40 the voltage at point 31 will be substantially equal to the voltage at point 21 when thermistor 40 is in air. When thermistor 40 is in fuel, the voltage at junction 31 will be some voltage corresponding to the voltage across a thermistor in air which is at the temperature surrounding thermistor 40. For example, if thermistors 40 and 45 were in liquid at low temperature, the voltage at point 21 would be equal to that shown at C in Figure 2, and the voltage at point 31 would be approximately that shown at B in Figure 2. If there is current through the diodes 50 and 56, points B and C would remain at about the same voltage although they would be shifted to the right along curves 72 and 70. If thermistors 40 and 45 were in liquid at high temperature, the voltage at point 21 would be substantially equal to that shown at point A in Figure 2 while the voltage at point 31 would be substantially equal to the voltage shown at point D in Figure 2. Whenever the thermistors are in liquid, the voltage at point 31 will be less than the voltage at point 21. This is true regardless of what temperatures the thermistors are placed in because thermistor 40 will always be cooler than thermistor 45.

It is noted that point 26 is separated from point 31 in Figure 1 by a diode 50. The purpose of this diode is to determine the voltage at point 26 with respect to point 31 whenever a current is flowing through the diode 50. The voltage drop across diode 50 is substantially constant whenever current is flowing through it and remains so regardless of changes in current within the normal operating range of the circuit. Point 26 then will be at some small voltage equal to the amount of voltage drop across diode 50 above point 31 and hence point 26 may be at a voltage higher or lower than that at point 21 depending upon the amount of the drop across diode 50. The potential drop across diode 50 may be adjusted by properly choosing the diode or by inserting several diodes in series until point 26 is properly located with respect to point 31. The voltage at point 26 is chosen so that it is higher than that at point 21 whenever the thermistors are in air and lower than point 21 whenever the thermistors are in fuel. The circuit of Figure 1 then operates to give a signal whenever the liquid level passes below the thermistors. For example, assume that the thermistors are in liquid at high temperature. The voltage at point 21 will be equal to that shown at A in Figure 2, while the voltage at point 31 will be substantially equal to that shown at D in Figure 2. Point 26, by properly choosing diode 50, may be at a voltage shown as point E in Figure 2 since the voltage a point 26 is higher than at point 31. The voltage represented by point E is such with respect to the point 21 that insufficient current will flow through relay 55 to cause operation and the circuit will show the thermistors to be submerged in fuel. Now if the thermistors are exposed to air at low temperature, point 21 will have a voltage substantially equal to that shown at point B and point 31 may also have a voltage equal to or slightly greater than that shown at point B. Since point 26 is adjusted to be higher than point 31 by the amount of voltage existing across diode 50, point 26 will be higher in voltage than point 21 and sufficient current will flow through relay 55 to operate it. This condition is true regardless of the normal temperature variations to which the thermistors 40 and 45 may be subjected. It is seen then, that the limits of temperature placed upon thermistors are greatly increased by the use of the circuit shown in Figure 1, and further that point 26 is compensated for temperature so as to provide the reference voltage which varies with changes in ambient temperature.

Assume now that the voltage of the voltage source is allowed to change. If the voltage E of source 10 were to decrease to some value E' a load line shown in Figure 2 as line 80 would exist again providing no diode current was present. Without the use of the compensating and regulating circuit, shown in Figure 1, the voltage at point 26 would change sharply when the voltage at point 10 changed and in so doing might change the point of operation of point 26 to where conduction across relay 55 might occur in error. This would give a false indication and is of course undesirable. However, with the use of the invention shown in Figure 1, the voltage at point 26 is maintained relatively constant regardless of changes in voltage of source 10. To show this assume that the voltage of source 10 changes to a new value, the voltage at point 26 would tend to change a proportional amount because of resistors 25 and 35. However, the voltage at point 31 is maintained relatively constant because of thermistor 45, which tends to regulate the voltage at point 31. It is seen in Figure 2 that curves 72 and 73 are relatively flat throughout their major portion and that increasing the current through the thermistor 45 does not appreciably change the voltage across it. Since thermistor 45 is always in air, its voltage will always follow one of the air curves which has this flatness. The voltage across thermistor 45 will not vary with current change so the voltage at point 31 maintains a relatively constant voltage. Changes in the voltage of source 10 only serve to produce more or less current through thermistor 45 so point 31 stays at a relatively constant voltage regardless of changes in supply voltage. As long as point 31 maintains a constant voltage, point 26 must follow closely because of the relatively constant voltage drop across diode 50 and hence by means of the circuit shown in Figure 1 point 26 will maintain a relatively constant voltage regardless of changes in supply voltage 10. This overcomes a major problem which prior art circuits have encountered.

Figure 3:
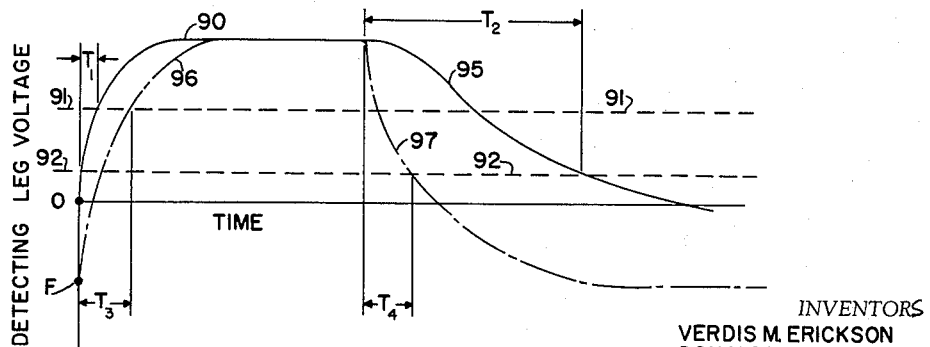
Figure 3 is a graph showing the response curves of the detecting leg of a level sensing bridge without and with the use of the present invention.

In Figure 3 the solid line curve represents response time of the voltage across the detecting leg of a level sensing bridge circuit without the use of the invention. The broken line represents the response time with the circuit of Figure 1. In Figure 3 portion 90 of the solid line curve represents the change of voltage with respect to time when the bridge goes from a condition of balance to unbalance by going from air to liquid. Dash line 91 represents the voltage across the points 21 and 26 which will cause the relay to pull in or actuate while voltage shown as dashed line 92 represents the voltage necessary to drop the relay out or deactivate the relay. It is seen that going from a condition of balance to unbalance from air to fuel the time T1 is required to pull the relay in. Times T1 has been found to be relatively short in duration since the thermistor responds quickly when going from air to liquid and since going from a condition of balance to a condition of unbalance the response curve has a steep slope at the point where the relay actuates. However, going from a condition of unbalance to balance when going from liquid to air, as shown along portion 95 of the solid line curve, a time T2 is required to drop the relay out. It has been found that time T2 greatly exceeds the amount of time desired for response, because when going from liquid to air, the thermistor takes time to dry off and evaporation cools the thermistor. Also, the curve for going from unbalance to balance has a flat slope in the region of relay deactuation and thus adds to the response time. In order to overcome this difficulty point 26 has been biased in Figure 1 to a voltage which is less than that at point 21 under conditions of balance and the circuit has been set up to be balanced when in liquid. In Figure 3, point F represents the voltage across the points 21 and 26 when at balance in liquid and portion 96 of the broken line curve represents the response time curve for going from a condition of balance to one of unbalance from liquid to air and has been superimposed on curve 90 for comparison. It is seen that the time to actuate the relay is increased somewhat since the evaporation effect is present but since the slope of the curve going from balance to unbalance is steep time T3 is much less than time T2, thus the response time going from liquid to air has been shortened considerably. Portion 97 of the broken line curve shows the response time when going from a condition of unbalance to balance from air to liquid using the invention. It is seen that the time T4 is now required to deactuate the relay and it has been found that time T4 is well within the required response time necessary for satisfactory operation of the device. The shortening of time T4 is due to the fact that the thermistor is going from air to liquid and due to the fact that the negative bias across points 21 and 26 causes the slope to be much steeper in the vicinity of dropping out of the relay. It is seen then that the circuit of Figure 1 accomplishes the result of decreasing the response time in going from liquid to air without appreciably increasing the response time in going from air to liquid.

Having now described our invention, it will be obvious to those skilled in the art that many modifications may be made without departing from the scope of the invention. For instance, if the thermal conductivities are correct, the sensor could be used to sense the level of gases or solids as well as liquids. Other constant voltage drop elements could be used rather than the diodes shown as for example a vacuum tube rectifier or a transistor. Furthermore, two or more components could be placed in any leg of the bridge to get desired characteristics. We intend therefore, only to be limited by the following claims.

We claim:

1. Apparatus of the class described comprising, in combination: a first impedance; a second impedance connected in series with said first impedance; a source of electrical potential connected across said first and second impedances; and means adapted to regulate and thermally compensate the voltage across said second impedance so that said voltage is not affected by variations in said source of electrical potential and so that said voltage varies inversely with temperature, said means including a substantially constant voltage device connected in series circuit with a negative temperature coefficient impedance, and means connecting said circuit in parallel with said second impedance.

2. Apparatus of the class described comprising, in combination; a first impedance; a second impedance connected in series with said first impedance; a source of electrical potential connected across said impedances; means adapted to regulate and thermally compensate the voltage across said second impedance so that said voltage does not change with variations in said source of electrical potential and so that said voltage does vary inversely with temperature, said means including a substantially constant voltage device connected in a first series circuit with a negative temperature coefficient impedance, means connecting said first circuit in parallel with said second impedance, a third impedance connected in a second series circuit with said constant voltage device, and means connecting said second circuit in parallel with said first impedance.

3. Apparatus of the class described comprising, in combination: a bridge circuit; a first impedance connected in one leg of said bridge circuit; a source of electrical potential connected across said bridge circuit; a detecting device connected in said bridge circuit so as to be sensitive to an unbalanced condition; a substantially constant voltage device; a negative temperature coefficient impedance connected in series with said constant voltage device; and means connnecting said constant voltage device and said negative temperature coefficient impedance in parallel with said first impedance.

4. Apparatus of the class described, comprising: a bridge circuit; a first negative temperature coefficient impedance connected in a first leg of said bridge circuit; a first impedance connected in an adjacent leg of said bridge circuit; a detecting device connected in said bridge circuit so as to be responsive to an unbalance; a source of potential connected across said bridge circuit; a substantially constant voltage device; a second negative temperature coefficient impedance connected in series with said constant voltage device; and means connecting said constant voltage device and said second negative temperature coefficient impedance in parallel with said first impedance.

5. A bridge circuit comprising: first and second impedances connected in first and second adjacent legs of said circuit; a third impedance connected in a third leg of said circuit; a first negative temperature coefficient impedance connected in a fourth leg of said circuit; a source of electrical potential connected across said circuit; a detecting device connected in said circuit so as to be responsive to an unbalanced condition; a substantially constant voltage device; a second negative temperature coefficient impedance connected in series with said constant voltage device; means connecting said constant voltage device and said negative temperature coefficient impedance in parallel with said third impedance; a fourth impedance connected in series with said constant voltage device; and means connecting said fourth impedance and said constant voltage device in parallel with said second impedance.

6. Apparatus for sensing the level of a fluid in a container, comprising: a bridge; a first negative temperature coefficient impedance mounted in said container at a predetermined level; means connecting said first negative temperature coefficient impedance in a first leg of said bridge; a first impedance; means connecting said first impedance in a second leg of said bridge; means connected in said bridge and sensitive to an unbalance thereof; means for regulating the voltage across said first impedance, said means including a substantially constant voltage device and a second negative temperature coefficient impedance connected in series; and means connecting said constant voltage device and said second negative temperature coefficient impedance in parallel with said first impedance.

7. Apparatus for sensing the level of a fluid in a container, comprising: a bridge; a first negative temperature coefficient impedance mounted in said container at a predetermined level so as to be exposed to said fluid whenever said fluid is above said level; a second negative temperature coefficient impedance arranged to be subjected to substantially the same temperature conditions as said first negative temperature coefficient impedance but so arranged as to never be exposed directly to said fluid; means connecting said first negative temperature coefficient in a first leg of said bridge; a first impedance connected in a second leg of said bridge; a substantially constant voltage device connected in series with said second negative temperature coefficient impedance; and means connecting said second negative temperature coefficient impedance and said constant voltage device in parallel with said first impedance.

8. Apparatus of the class described, comprising: a first impedance; a second impedance; a first conductor connecting said first and second impedance; a third impedance; a second conductor connecting said second and third impedance; a first negative temperature coefficient impedance; a third conductor connecting said third impedance and said negative temperature coefficient impedance; a fourth conductor connecting said first impedance and said negative temperature coefficient impedance; a source of electrical potential; means connecting said source to said first and third conductors; a detecting device; a first diode connected in series with said detecting device; means connecting said diode and said detecting device to said second and fourth conductor; a second diode; a second negative temperature coefficient impedance; a fifth conductor connecting said second diode and said second negative temperature coefficient impedance; means connecting said second diode and said second negative temperature coefficient impedance to said second and third conductors; a fourth impedance; and means connecting said fourth impedance to said first and fifth conductors.

9. Condition responsive apparatus comprising, in combination: first, second, third and fourth impedances connected to form a bridge, said fourth impedance being temperature sensitive; a source of voltage connected across first opposite terminals of said bridge; a detecting leg connected across second opposite terminals of said bridge and operable to detect an unbalance of said bridge when the value of said fourth impedance changes due to a temperature change; fifth and sixth impedances connected in series to form a junction, said sixth impedance being temperature sensitive; means connecting said series connected fifth and sixth impedances across the first opposite terminals of said bridge; and a substantially constant voltage device connected between the junction and one of the second opposite terminals of said bridge.

10. Fluid level sensing apparatus for use with a container of fluid comprising in combination: a bridge network having input terminals and output terminals; a first thermistor mounted at a predetermined level in the container so as to be exposed to the fluid; means connecting said thermistor in one leg of said bridge; a voltage source connected across the input terminals of said bridge; detection apparatus connected across the output terminals of said bridge and operable to detect an unbalance of said bridge occasioned by a change in the level of fluid in the container which affects said thermistor; a second thermistor mounted proximate said first thermistor in the container but protected from direct exposure to the fluid; impedance means connected in series with said second thermistor to form a junction; means connecting said series connected impedance and thermistor across the input terminals of said bridge; a substantially constant voltage diode; and means connecting said diode between the junction and that output terminal of said bridge which is not connected to said first thermistor.

References Cited in the file of this patent

UNITED STATES PATENTS

| | | |
|---|---|---|
| 2,465,683 | Griesheimer | Mar. 29, 1949 |
| 2,743,413 | Johnson | Apr. 24, 1956 |
| 2,824,278 | Johnston | Feb. 18, 1958 |